Jan. 20, 1959 W. E. LEWIS 2,870,317
ELECTRIC SURFACE HEATING UNIT
Filed Dec. 19, 1957

INVENTORS
WALTER E. LEWIS
BY T. G. Dypart
HIS ATTORNEY

United States Patent Office 2,870,317
Patented Jan. 20, 1959

2,870,317

ELECTRIC SURFACE HEATING UNIT

Walter E. Lewis, Louisville, Ky., assignor to General Electric Company, a corporation of New York Application December 19, 1957, Serial No. 703,868

1 Claim. (Cl. 219—37)

This invention relates to electric heating units and more particularly to an electric surface cooking unit of the type having a sheathed heating element coiled in flat spiral configuration so as to form a horizontally disposed cooking utensil support.

In order to reduce the time required to cook the various foods ordinarily cooked in a utensil heated by a surface cooking unit, electric surface units of higher and higher wattage ratings have been developed by heating unit manufacturers, and at the present time electric ranges equipped with surface units rated at 2600 watts are not uncommon. Insofar as heating units of conventional construction are concerned, such heating units approach the upper limit of wattage ratings because their over-all diameter must, as a practical matter, be limited to approximately 8 inches (most utensils are no larger than this) and any increase in the size of the heating element increases its mass, and hence the time required to heat the element to its operating temperature. It will of course be understood that the basic factor underlying these limitations is the inability of heating element materials to withstand frequent operation at temperatures higher than 1800° F. Since the highest heating element temperatures are encountered when the element is fully energized without a load (i. e., without a relatively cool cooking utensil and contents resting on the unit) it has been necessary to limit the wattage ratings of conventional surface heating units to values below those which would be satisfactory during actual cooking operations.

A principal object of this invention is to provide a high wattage surface cooking unit having the capacity to transfer heat at a very high rate to a cooking utensil and, when energized without a utensil thereon, to dissipate heat to the atmosphere at a rate high enough to prevent overheating.

Another object of the invention is to provide a high wattage surface cooking unit having a top surface adapted to engage a cooking utensil in intimate heat transfer relation, and a bottom surface arranged to provide improved radiation of heat under no-load conditions.

Further objects and advantages of the invention will become apparent as the following description proceeds, and the features of novelty which characterize the invention will be pointed out with particularity in the claim annexed to and forming a part of this specification.

Briefly stated, in accordance with one aspect of this invention I provide a horizontally disposed surface cooking unit including a convoluted sheathed heating element, and radiating fin means associated with the bottom surface of the heating element so arranged that when the heating element is energized without a cooking vessel resting thereon excessive heat which would otherwise cause dangerous overheating of the unit is radiated to the surrounding atmosphere.

For a better understanding of this invention, reference may be made to the following description and the accompanying drawing in which.

Figure 1:
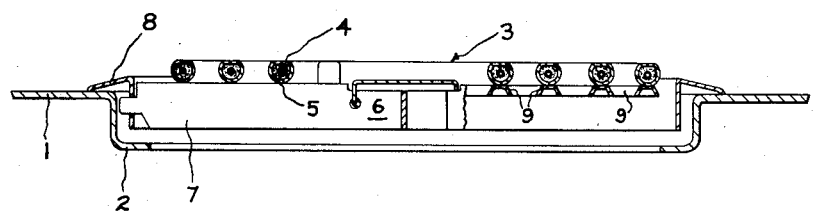
Fig. 1 is a cross-sectional view, in elevation, of a surface cooking unit embodying the present invention.
Figure 2:
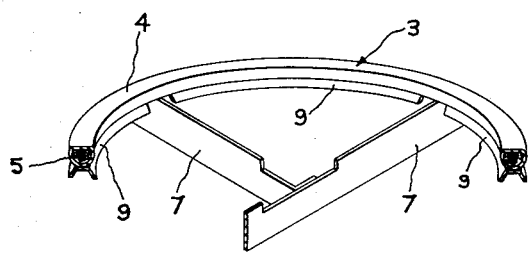
Fig. 2 is a fragmentary perspective view of the heating unit shown in Fig. 1.

Referring to Figs. 1 and 2 in the drawing, the numeral 1 designates the top surface of an electric range or the like having a generally circular opening defined by a flange 2 arranged to accommodate an electric surface cooking unit therein. It will of course be understood that the heating unit of the present invention may be mounted in any other suitable housing or cabinet, such as an individual hot plate housing, for example. The cooking unit comprises a sheathed heating element 3 coiled in flat spiral configuration so as to form a horizontally disposed support for cooking vessels and the like. Heating element 3 includes a tubular metal sheath 4 enclosing a resistance heater wire 5 which is supported by a compacted mass of heat conducting electrical insulating material such as magnesium oxide. In the illustrated embodiment, heating element 4 has four convolutions which are arranged in radially spaced relationship and supported on a supporting grid 6 adapted to be supported on top surface 1. Supporting grid 6 includes a plurality of radially extending arms 7 and a mounting ring 8 fixedly secured to the outermost ends of arms 6 so as to form a unitary structure. Preferably the top surface of heating element 4 is flattened so as to provide maximum heat transfer surface area on that portion of the element which contacts the bottom of a cooking utensil resting thereon.

When a heating unit of the general type described above is energized at its maximum wattage the temperature of its sheath will be substantially higher in the absence of a heating utensil than when a heating utensil is resting on the surface thereof so as to receive heat therefrom. In other words, the heat generated by resistance element 5 and transferred to sheath 4 by conduction through the insulating material therebetween is more rapidly dissipated when a relatively cool body such as a cooking utensil is in heat transfer relationship with sheath 4 than when all of the heat received by sheath 4 must be radiated or otherwise transferred to the surrounding atmosphere and supporting structure.

It has been determined that the maximum temperature obtained by the sheath of a heating unit of the type described above is a function of the "watt density" of the heating element. The term "watt density" as used in this specification refers to the ratio of the power generated in a heating element to the surface area of the heating element, and may be expressed as watts per square inch, for example. Thus if it is desired to increase the wattage rating of a particular sheathed heating element without a corresponding increase in its watt density, this may be accomplished by increasing the surface area of the sheath in substantially direct proportion to the desired increase in wattage rating. This may be done by increasing the length of the heating element (and hence the diameter of the surface unit formed therefrom) or by increasing the diameter of the sheath (and hence the mass of the heating unit). Both of these approaches to the problem have definite disadvantages, as pointed out at the beginning of this specification.

In accordance with the present invention a novel heating unit having means for dissipating excess heat generated by the heating unit has been provided. As shown in Figs. 1 and 2 heating element sheath 4 is provided with radiating means on its bottom portions, the radiating means being preferably in the form of elongated fins 9 formed from strips of metal bent so as to provide downwardly projecting radiating surfaces. It will be evident that these radiating fins effectively increase the surface area of sheath 4 without appreciably increasing the mass of the unit. The fin structure 9 may be U-shaped in cross section, thus providing a pair of downwardly extending fins circumferentially extending along the length of the sheath 4. In order to facilitate mounting of heating unit 3 on supporting spider 6, it is desirable that the radiating fins be welded to the bottom of sheath 4 in sector shaped lengths extending between adjacent arms 7 of spider 6. It has been found that the wattage rating of a heating unit may be increased by 30%–40% if fins providing a proportional increase in sheath surface area are secured to the sheath in the manner provided by the present invention. For example, the 2600 watt surface unit mentioned earlier in this specification may be converted into a 3500 watt unit by the addition of radiating fins providing an increase in radiating surface approximately 33%, it being understood that a resistance coil of suitably lower resistance is utilized in the higher wattage unit.

Figure 3:
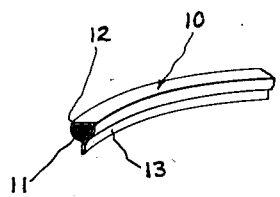
Fig. 3 is a fragmentary view of a modified form of heating element constructed in accordance with the present invention.

In accordance with another embodiment of this invention, a sheathed element having an integrally formed fin structure may be utilized. Thus, as shown in Fig. 3, heating element 10 includes a resistance heater 11 enclosed within a sheath 12 and is provided with a downwardly extending fin portion 13. In this construction fin 12 is formed at the time tubular sheath 11 is fabricated from a suitable strip of metal, and the completed tube is formed by welding one edge of the strip to the portion of the sheath immediately adjacent the uppermost edge of fin 13. As in the embodiment illustrated in Fig. 2, it may be desirable to provide an interrupted fin arranged so as not to interfere with the mounting of sheath 12 on arms 6 and if this is the case notches or openings along the length of fin 13 may be formed either before or after sheath 11 is formed and welded in the configuration illustrated.

It will be understood that neither the fin structure 9 shown in Fig. 2 nor the fin 13 shown in Fig. 3 appreciably increases the total mass of the heating element although each provides a very substantial increase in the surface area of the heater so that the heat radiating capacity of the heating element as a whole is increased without a corresponding increase in the time required to heat the element to its operating temperature.

In operation, when a cooking utensil is placed on heating element 3 the average temperature of the sheath 4 will ordinarily remain below approximately 700–800° F. so long as the utensil and its contents are capable of absorbing substantial quantities of heat. When the cooking utensil is removed, however, (or if it contains water and boils dry) the temperature of the sheath 4 will begin to increase, and without the radiating means of the present invention, would increase to a temperature of the order of approximately 1800° F. since the heat generated by resistance element 5 cannot be dissipated to the atmosphere as rapidly as it can be transferred to a relatively cool cooking utensil. However, as the temperature of sheath 4 increases the rate of heat radiation increases, and by virtue of the additional radiating surface provided by fins 9 the maximum temperature of sheath 4 is limited to a safe value, approximately 1550° F., for example. Fin 13 in the embodiment of the invention shown in Fig. 3 functions in the same manner to limit the temperature of sheath 12 to a safe value.

While there has been shown and described two particular embodiments of this invention, it is not desired that the invention be limited to the particular constructions disclosed, and I intend by the appended claim to cover all modifications within the true spirit and scope of the invention.

What I claim is:

An electric surface heating unit comprising a heating element including a resistance heater enclosed within a generally tubular metal sheath, said heating element being coiled in flat spiral configuration so that its top surface forms a horizontally disposed support for cooking utensils and the like, a supporting grid for said heating element, and an elongated strip of sheet metal of U-shaped configuration welded to the bottom surface of said tubular sheath with the two leg portions thereof projecting downwardly so as to form heat radiating fins extending along substantially the entire length of said tubular sheath.

References Cited in the file of this patent

UNITED STATES PATENTS

| | | |
|---|---|---|
| 2,302,808 | Smith | Nov. 24, 1942 |
| 2,361,874 | Russell | Oct. 31, 1944 |
| 2,462,016 | Wiegand | Feb. 15, 1949 |
| 2,591,442 | C. Lacy-Hulbert et al. | Apr. 1, 1952 |